United States Patent
Strobl

[19]

[11] Patent Number: 6,157,110
[45] Date of Patent: Dec. 5, 2000

[54] ROTOR

[75] Inventor: Georg Strobl, Stuttgart, Germany

[73] Assignee: Johnson Electric S.A., La Chaux-de-Fonds, Switzerland

[21] Appl. No.: 09/320,725

[22] Filed: May 27, 1999

[30] Foreign Application Priority Data

May 29, 1998 [GB] United Kingdom .................... 9811457

[51] Int. Cl.⁷ .............................. H02K 1/22; H02K 3/46; H02K 39/04; H02K 39/06; H02K 39/08

[52] U.S. Cl. .................... 310/261; 310/236; 310/237; 310/234; 310/60 A; 310/61; 310/270; 310/71

[58] Field of Search ...................... 310/236, 237, 310/233, 234, 235, 60 A, 52, 54, 61, 261, 227, 270, 260, 264, 71, 89

[56] References Cited

U.S. PATENT DOCUMENTS

| | | | |
|---|---|---|---|
| 2,372,453 | 3/1945 | Sherman et al. | 310/270 |
| 2,381,533 | 8/1945 | Forss | 310/270 |
| 2,683,233 | 7/1954 | Ruhl | 310/270 |
| 3,532,913 | 10/1970 | Forste et al. | 310/236 |
| 3,873,243 | 3/1975 | Nusser et al. | 417/368 |
| 3,919,572 | 11/1975 | Desy | 310/45 |
| 4,105,906 | 8/1978 | Ade et al. | 310/87 |
| 4,574,210 | 3/1986 | Wieland | 310/59 |
| 4,656,380 | 4/1987 | Strobl | 310/236 |
| 4,694,211 | 9/1987 | Bayha et al. | 310/71 |
| 4,800,315 | 1/1989 | Schulz et al. | 310/261 |
| 5,369,326 | 11/1994 | Strobl | 310/235 |
| 5,607,293 | 3/1997 | Luedtke | 417/423.7 |
| 5,679,996 | 10/1997 | Strobl | 310/237 |
| 5,793,140 | 8/1998 | Tuckey | 310/237 |

FOREIGN PATENT DOCUMENTS

| | | |
|---|---|---|
| 3230699A1 | 2/1984 | Germany . |
| 19500603A1 | 7/1996 | Germany . |
| 2064228 | 6/1981 | United Kingdom . |
| 2247994 | 3/1992 | United Kingdom . |

*Primary Examiner*—Nestor Ramirez
*Assistant Examiner*—Dang Dinh Le
*Attorney, Agent, or Firm*—Birch, Stewart, Kolasch & Birch, LLP

[57] ABSTRACT

A rotor for a fuel pump motor has a shaft and a rotor core fitted to the shaft. A commutator is located on the shaft adjacent one end of the rotor core. Windings wound around poles of the rotor core are connected to terminals of segments of the commutator. A cover is fitted to the other end of the rotor core covering the ends of the windings protruding from the core. The cover has axially extending legs which are pressed into gaps between adjacent heads of the rotor poles. The commutator has an integral shroud in the form of a radially outer peripheral skirt extending axially from a radial wall of the commutator base towards the rotor core to cover the terminals and the ends of the windings protruding from the commutator end of the rotor core. A gap is left between the rotor core and the skirt and there are holes in the cover and radial wall of the commutator for the passage of fuel to cool the rotor.

19 Claims, 3 Drawing Sheets

ROTOR

BACKGROUND OF THE INVENTION

1. Field of the Invention

This invention relates to electric motors and in particular, to a rotor and commutator for use in a fuel pump motor. Fuel pump motors are used in vehicles to transfer fuel from the fuel tank to the engine.

2. Background Art

In a fuel pump motor the fuel passes through the motor allowing the motor and pump to be submerged within the fuel tank or formed as part of the fuel line reducing the risk of leaks between the pump and the motor. The motor is a direct current motor which has a permanent magnet stator and a wound rotor or armature. Brushes and a commutator connect the windings of the rotor to an external power supply. Because the rotor is submerged in fuel, care is taken to make the rotor aerodynamic to reduce the power required to physically turn the rotor within the fuel, which is considerably more than the power required to turn the rotor in air as the fuel is more dense. The difference in power required to turn the rotor between wet and dry running is known as punch losses.

To reduce punch losses, it is known to fully encapsulate the rotor by over molding the rotor, once it has been wound. This is the best solution from a fluid dynamics view point, but the material of the encapsulation also thermally insulates the rotor windings leading to higher winding temperatures and a higher risk of failure. This can be overcome by using larger diameter wire, but this leads to a larger motor and greater cost. The cost of over molding the rotor is also an important disadvantage and there is a problem with segment contamination.

Another known method which is very cost effective is a compromise in which a cover is placed over the end of the rotor remote from the commutator and covers the ends or heads of the windings protruding from this end of the rotor core. This end is the leading end in the fuel flow direction and this cover reduces turbulence at the leading end of the rotor. It also allows some fuel to flow through the rotor in contact with the windings to keep the rotor core and windings cool. However, as the commutator connections and the winding heads at the commutator end are exposed, the punch losses are still significant.

Hence, there is a need for a rotor for a fuel pump motor which has reduced punch losses associated with the commutator connections at a reasonable cost.

SUMMARY OF THE INVENTION

According to a first aspect, the present invention provides a commutator for a wound rotor of a motor; the commutator includes: a commutator base; a plurality of commutator segments carried by and secured to the base, each segment having an integral slotted terminal for receiving and gripping a respective connector portion of a winding of the rotor; and a crown having a plurality of housings for receiving the terminals of the commutator segments, each housing having a pair of open ended slots for receiving a respective connector portion of the winding, wherein the commutator base has an axially extending annular skirt radially surrounding the terminals and forming a cavity for at least partially accommodating the crown and an axial end of the winding.

According to a second aspect, the present invention provides a rotor for a fuel pump motor, including: a shaft; a rotor core mounted on the shaft and having a plurality of salient poles; rotor windings wound around the salient poles and having connector portions; and a commutator fitted to the shaft adjacent one end of the rotor core. The commutator has a commutator base; a plurality of commutator segments and a crown. The segments are fitted to the base and each segment has a slotted terminal for receiving and gripping a respective connector portion of the rotor winding. The crown has a plurality of housings for receiving the terminals. Each housing has a pair of open ended slots for receiving a respective connector portion during winding of the rotor and for supporting the respective connector portion during mating of the terminals with the connector portions as the terminals are pressed into the housings by relative axial movement between the commutator base and the crown. The commutator base has an axially extending annular skirt radially surrounding the terminals and forming a cavity which at least partially accommodates the crown and an axial end of the windings.

In this manner, the turbulence caused by the commutator connections and the winding heads at the commutator end can be reduced. As the windings are not over molded on to the rotor core, fuel will penetrate the rotor core and cool the windings.

Preferably, the commutator base has a radial wall and the skirt extends from a radially outer edge portion of the wall. The radial wall allows the commutator base to have a plurality of ribs extending between the radial wall and the skirt to strengthen the skirt.

Ideally, there are twice as many ribs as terminals and each terminal is respectively located between an adjacent pair of ribs.

To increase the flow of fuel through the rotor core, the radial wall may have one or more apertures for the passage of the fuel. Indeed, there may be an axial gap between the skirt and the rotor core to ensure a reasonable flow of fuel about the rotor windings while still reducing turbulence. Additionally or alternatively, the skirt may be divergent.

Preferably, each commutator segment has a conductive metal terminal portion partially embedded in a carbon material brush contact portion. This is particularly desirable for fuels with a high alcohol content.

Preferably, the commutator segments form a cylindrical sliding contact surface or a planar sliding contact surface.

BRIEF DESCRIPTION OF THE DRAWINGS

Two preferred embodiments of the invention will now be described by way of example only with reference to the accompanying drawings in which.

DESCRIPTION OF THE PREFERRED EMBODIMENTS

Figure 6:
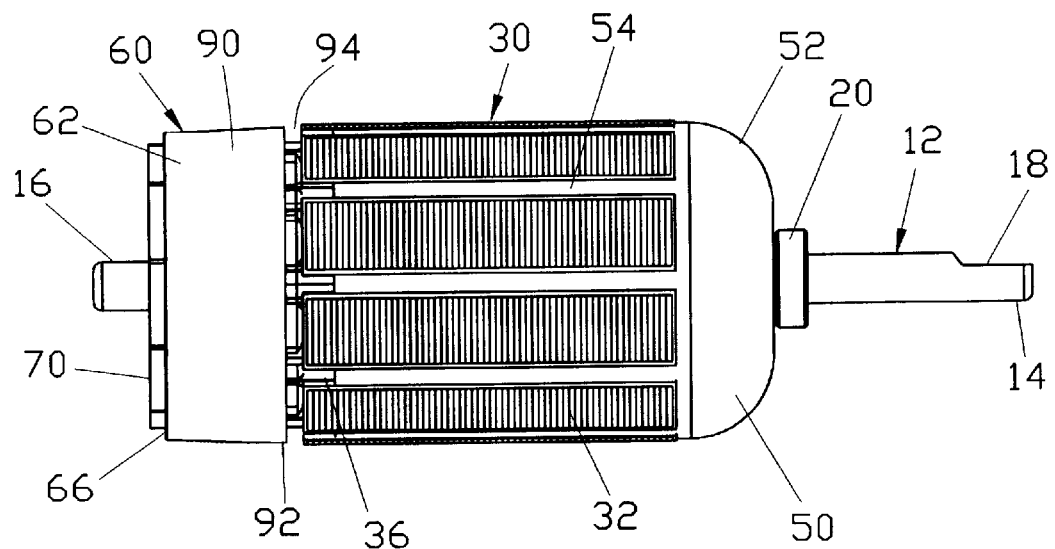
FIG. 6 is a side view of a rotor for a fuel pump motor having a planar type commutator according to a second embodiment.
Figure 7:
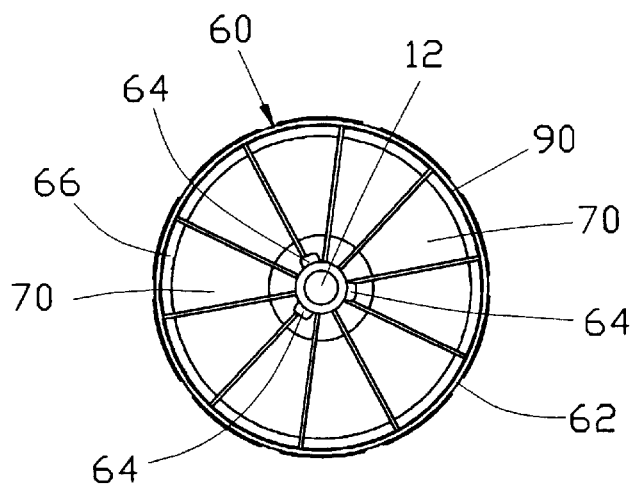
FIG. 7 is an end view of the rotor of FIG. 6 viewed from the commutator end.
Figure 8:
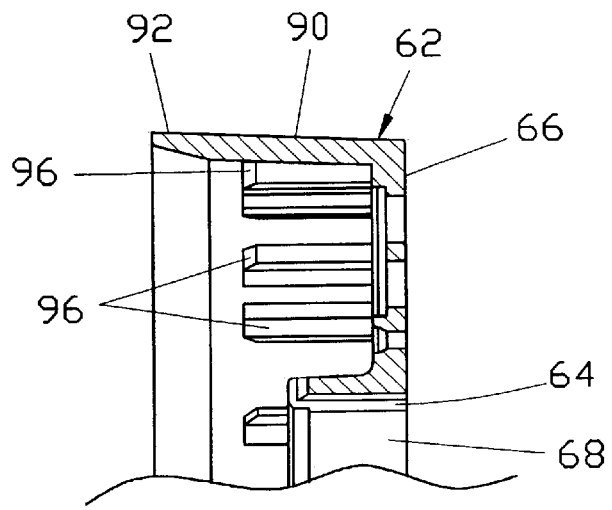
FIG. 8 is an enlarged sectional view of a base part of the commutator of the rotor of FIG. 6.

Two embodiments will now be described in detail. The first preferred embodiment is shown in FIGS. 1 to 5 and is a rotor with a cylindrical commutator. The second embodiment is shown in FIGS. 6 to 8 and is a rotor with a planar commutator.

Figure 1:
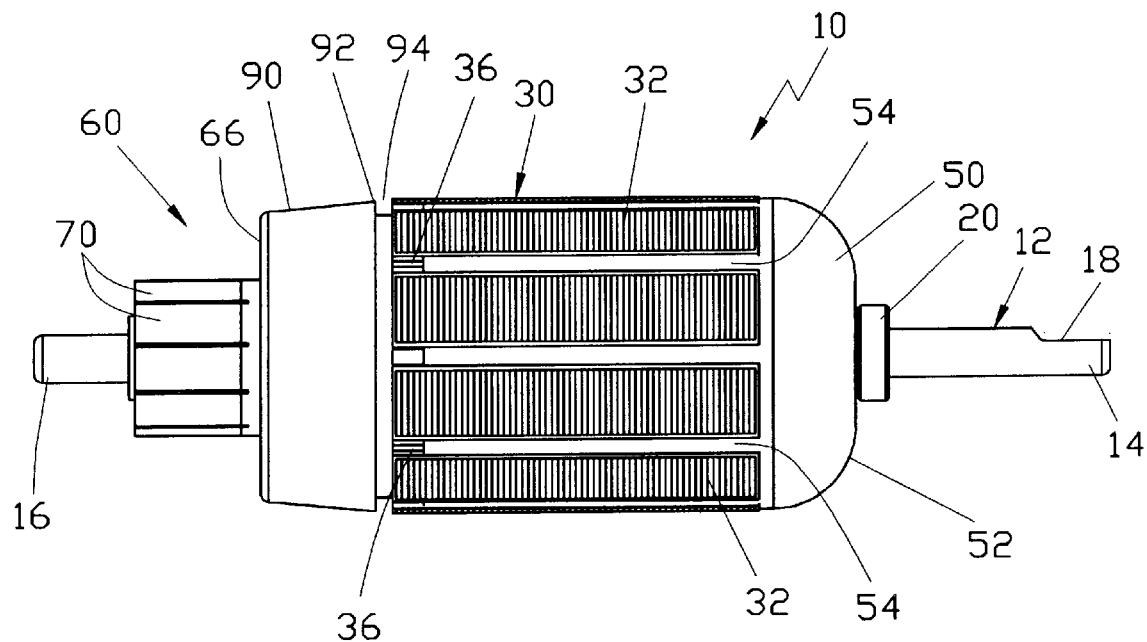
FIG. 1 is a side view of a rotor for a fuel pump motor according to the first embodiment and having a cylindrical type commutator.
Figure 2:
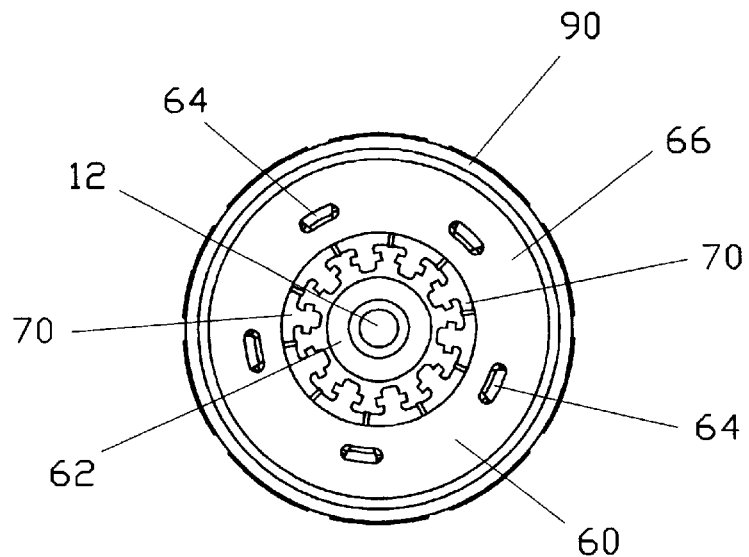
FIG. 2 is an end view of the rotor of FIG. 1 viewed from the commutator end.
Figure 3:
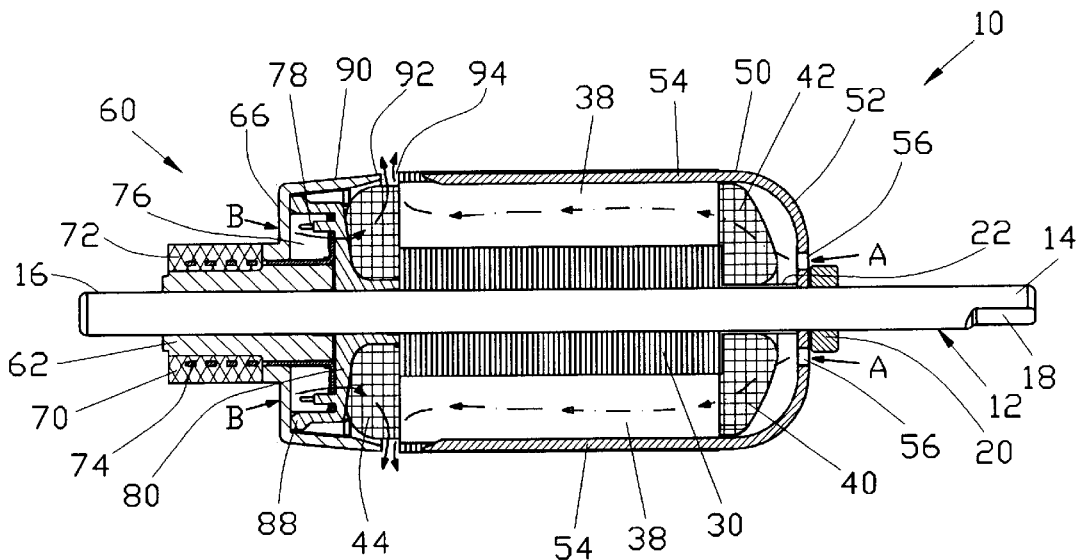
FIG. 3 is a sectional view of the rotor of FIG. 1.

FIG. 1 is a side view of the preferred rotor and FIG. 2 is an end view of the rotor viewed from the commutator end. FIG. 3 is a longitudinal sectional view of the rotor of FIG. 1. The rotor 10 has a shaft 12, a rotor core 30, a cover 50, a collar 20 and a commutator 60. The shaft 12 has a drive end 14 and a non-drive end 16. The drive end 14 has a key way or flat portion 18 for keying an impeller of a pump.

The rotor core 30 is a plurality of stamped laminations stacked together and pressed onto the shaft 12 with an interference fit. The laminations are stamped from sheet magnetic steel. The core has a plurality, in this case ten, salient poles 32. Each pole has a radially extending shank supporting an enlarged head. Adjacent heads are separated by a small gap 36 to facilitate winding of the windings. The shanks of adjacent poles form winding tunnels 38 through which the windings pass.

Rotor windings 40 are wound around the poles 32 of the rotor core 30. The windings are coils of copper wire insulated by a varnish coating. This wire is known as magnet wire as it forms the electromagnetic fields of the rotor. Additional insulating material may be applied directly to the rotor core or provided between the core and the windings. The windings 40 protrude from the axial ends of the rotor core 30 and the protruding portions are known as winding heads 42, 44. At the drive end of the rotor the winding heads 42 are prevented from making direct contact with the shaft 12 by an insulating sleeve 22. At the other end the winding heads 44 are supported by the commutator as will be described later.

Fitted to the drive end of the rotor core 30 is the cover 50. The structure of the cover 50 is shown more clearly in FIG. 3. The cover 50 has the curved top 52 having a central through hole for the shaft and a plurality of axially extending elongate legs 54. The legs 54 are pressed into the small gaps 36 between adjacent heads of the poles 32 of the rotor core 30. While this does support the cover 50 in place, at least temporarily, their primary function is to close the gaps 36 to reduce the turbulence and punch losses caused by the gaps between the poles as the rotor rotates in fuel. The legs 54 extend almost the full length of the rotor core 30. The cover 50 covers the winding heads 42 at the drive end to reduce the drag at the leading end of the rotor. The collar 20 is a press fit on the shaft outside of the cover 50. The collar 20 retains the cover 50 in position by nipping the cover 50 against the sleeve 22, as well as providing an abutment surface for a thrust bearing (not shown). Two apertures 56 in the cover 50 near the collar can be seen in FIG. 3. These apertures 56 allow some fuel to pass into the interior of the cover and the rotor core to cool the windings 40.

Figure 4:
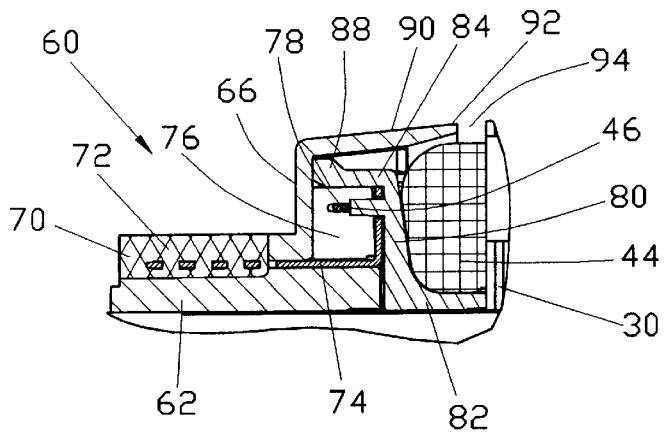
FIG. 4 is an enlarged sectional view of a part of the commutator of the rotor of FIG. 3.

The commutator 60 is mounted on the shaft 12 adjacent a non-drive end 16 of the rotor core 30. As shown in FIG. 2, the commutator 60 is of the cylindrical type with ten commutator segments 70 located on the outer surface of a sleeve-like portion forming part of the commutator 60. Five apertures 64 are visible in a radially extending wall 66 of the commutator 60 to allow for the passage of fuel. As shown in FIGS. 3 and 4, the commutator has a crown 80 and a base 62 supporting the commutator segments 70. The segments 70 have carbon material bodies 72 molded to the base 62 with embedded conductive strips 74 of copper or brass with insulation displacing mechanical connection type terminals 76 for connecting to lead wires or connector portions of the rotor windings. Each terminal 76 has an axially extending slot 78 which straddles and grips a lead wire as it is forced into the slot 78.

The crown 80 has an integral sleeve part 82 which spaces the crown from the rotor core and prevents the non-drive end winding heads 44 from contacting the shaft 12. The crown 80 is fitted to the shaft before the rotor windings are wound, and the sleeve part 82 abuts the rotor core 30. The crown 80 has a plurality of housings 84 which receive the terminals 76 of the commutator segments. The housings 84 have slots 86 for receiving the lead wires 46. Once the crown is fitted to the shaft, the rotor is wound. After the rotor is wound, the base 62 of the commutator is pressed onto the shaft 12 into contact with the crown 80 so that the terminals 76 are received within respective housings 84. As the terminals are pressed into the housings, the lead wires are forced into the slots, stripping away the insulation on the wires at the points of contact between the wires and terminals to establish electrical connections.

A shroud extends from the radially extending wall 66 of the base of the commutator 60 towards the rotor core 30. The shroud has a radially outer peripheral skirt 90 which covers the connections between the commutator terminals 76 and the lead wires 46 and extends over the non-drive end winding heads 44. A small axial gap 94 is left between the rotor core 30 and a distal end 92 of the skirt 90 to allow for passage of fuel used to cool the rotor core and windings.

FIG. 4 is an enlarged sectional view of the commutator of FIG. 3 showing more clearly a lead wire 46 in the slot 78 of a terminal and the axial gap 94 between a distal end 92 of the skirt 90 and the rotor core 30. The distal end 92 of the skirt 90 is tapered to provide a small clearance from the winding heads 44. It can be seen that the skirt 90 itself is slightly diverging towards the rotor core 30 to improve fluid dynamics. The crown 80 has an enlarged portion 88 at the radially outer edge of each housing 84 which engages the commutator base 62 at the junction between the skirt 90 and the radial wall 66. These enlargements 88 form an abutment surface for correctly aligning the commutator base 62 axially and radially with respect to the crown 80 while supporting the skirt 90.

Figure 5:
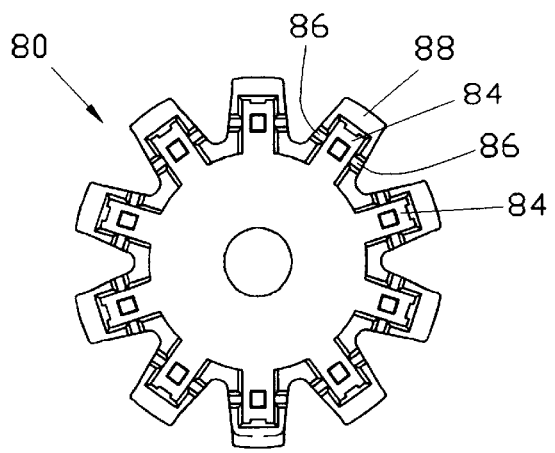
FIG. 5 is an end view of a crown being a part of the commutator of the rotor of FIG. 3.

FIG. 5 is an end view of the crown 80 of the commutator assembly. This view shows the individual housings 84 for the commutator terminals 76. Each housing 84 is in the form of a small box extending radially from a central portion of the crown 80 and having an open axial face for receiving the terminals 76. Each housing 84 has a transverse slot 86 for receiving a lead wire. The housings 84 are salient or separate as there needs to be a gap between the housings to enable the windings to be wound efficiently. When the crown 80 is rotating in fuel, the housings 84 act as paddles or vanes of a centrifugal pump, helping to move the fuel through the rotor core and/or shroud to cool the rotor.

In use the fuel flows passed the rotor from the impeller and thus the cover 50 is the leading end of the rotor. Most of the fuel will flow around the rotor 10 with minimal turbulence because of the smooth surface provided by the cover and shroud. A small percentage of the fuel will flow through the holes 56 in the cover, along the winding tunnels and out through the gap 94 between the shroud and the rotor core as indicated by arrows A in FIG. 3. A small percentage of fuel will also flow in through the apertures 64 in the radial wall 66 of the commutator and out through the gap 94 between the shroud and the rotor core as indicated by arrows B. Both flows are generally assisted by the pumping action of the housings of the crown and keep the windings and the rotor core cool.

A second embodiment will now be described with reference to FIGS. 6 to 8. The motor is of similar construction to the rotor of FIG. 1 and will not be described again. Parts similar to the first embodiment have similar reference numerals. FIG. 6 is a side view of the rotor and FIG. 7 is an end view of the rotor of FIG. 6 viewed from the commutator end. The commutator 60 is different in that it is a planar type commutator, also known as a face plate commutator. As previously, the commutator 60 has ten segments 70 located on the commutator base 62 and with insulation displacing mechanical connection type terminals fitted in housings on the crown (not shown). In this case, the segments are supported by the radially extending wall 66 and not by a sleeve-like portion of the base.

The base 62 incorporates an integral shroud in the form of a radially outer peripheral skirt 90 extending axially towards the rotor core 12 from the radially extending wall 66. The skirt 90 stops short of the rotor core 30 to provide an axial gap 94 for the passage of fuel between the shroud and the core. The skirt 90 forms a cup-like shroud having an interior space covering the connections between the commutator segments and the lead wires, and the winding heads at the commutator end of the rotor core (not shown).

In FIG. 7, the slightly tapering skirt 90 can just be seen radially outward of the ten commutator segments. At the center of the commutator, the protruding end of the shaft 12 is visible. Adjacent the shaft and radially inward of the segments 70, there are three apertures 64. These apertures 64 allow for passage of fuel into the interior of the shroud enabling a flow of fuel for cooling the windings and the rotor core.

FIG. 8 is a sectional view of a part of the base portion of the commutator of FIG. 6 without the segments attached, illustrating the cup-like shape given to the base 62 by the skirt 90 of the shroud. The apertures 64 are shown as being channels formed in the through hole 68 for the shaft although separate through holes could be provided either instead of or in addition to the channels for introducing fuel into the inner space of the shroud. The other holes visible in the cross-section are provided for the attachment of the commutator segments. Ribs 96 shown in the inner periphery of the skirt 90 provide stiffening for the skirt and are also used for locating the base with respect to the crown (not shown). The ribs 96 and the housings of the crown act as vanes of a centrifugal pump to pump the fuel through the cover, shroud and rotor core for cooling of the rotor core. Although other combinations of terminal housings and ribs may be used, it is considered ideal to have twice the number of ribs as housings with the housings being located between respective pairs of adjacent ribs when the base is assembled with the crown. In this way the ribs can be used to align the terminals with the housings during assembly.

While the invention has been described with reference to two preferred embodiments, those skilled in the art will recognize many variations and it is intended that all such variations fall within the scope of the invention as defined by the following claims. For example, while the skirt has been described as stopping short of the rotor core, it may engage the rotor core and have a number of holes for the passage of fuel. Indeed, to support the distal end of the skirt, the skirt may have axially extending fingers which are pressed into the gap between adjacent heads of the poles similar to and abutting the legs of the cover.

I claim:

1. A commutator for a wound rotor of a motor; the commutator comprising:
    a commutator base;
    a plurality of commutator segments carried by and secured to the base, each segment having an integral slotted terminal for receiving and gripping a respective connector portion of windings of the rotor; and
    a crown having a plurality of housings for receiving the terminals of the commutator segments, each housing having a pair of open ended slots for receiving a respective connector portion of the windings,
    wherein the commutator base has an axially extending annular skirt radially surrounding the terminals and forming a cavity for at least partially accommodating the crown and an axial end of the windings.

2. The commutator of claim 1, wherein the commutator base has a radial wall and the skirt extends from a radially outer edge portion of the wall.

3. The commutator of claim 2, wherein the commutator base has a plurality of ribs extending between the radial wall and the skirt to strengthen the skirt.

4. The commutator of claim 3, wherein there are twice as many ribs as terminals and each terminal is respectively located between an adjacent pair of ribs.

5. The commutator of claim 2, wherein the radial wall has at least one through passage communicating with the cavity.

6. The commutator of claim 1, wherein each commutator segment comprises a conductive metal terminal portion partially embedded in a carbon material brush contact portion.

7. The commutator of claim 1, wherein the commutator segments form a cylindrical sliding contact surface.

8. The commutator of claim 1, wherein the commutator segments form a planar sliding contact surface.

9. The commutator of claim 1, wherein the axially extending annular skirt is divergent.

10. A rotor for a fuel pump motor, comprising
    a shaft;
    a rotor core mounted on the shaft and having a plurality of salient poles;
    rotor windings wound around the salient poles and having connector portions; and
    a commutator fitted to the shaft adjacent one end of the rotor core, the commutator having a commutator base; a plurality of commutator segments fitted to the base, each segment having a slotted terminal for receiving and gripping a respective connector portion of the rotor winding; and a crown having a plurality of housings for receiving the terminals, each housing having a pair of open ended slots for receiving a respective connector portion during winding of the rotor and for supporting the respective connector portion during mating of the terminals with the connector portions as the terminals are pressed into the housings by relative axial movement between the commutator base and the crown,
    wherein the commutator base has an axially extending annular skirt radially surrounding the terminals and forming a cavity which at least partially accommodates the crown and an axial end of the windings.

11. The rotor of claim 10, wherein the commutator base has a radial wall and the skirt extends from a radially outer edge portion of the wall.

12. The rotor of claim 11, wherein the commutator base has a plurality of ribs extending between the radial wall and the skirt to strengthen the skirt.

13. The rotor of claim 12, wherein there are twice as many ribs as terminals and each terminal is respectively located between an adjacent pair of ribs.

14. The rotor of claim 11, wherein the radial wall has at least one through passage communicating with the cavity.

15. The rotor of claim 10, wherein each commutator segment comprises a conductive metal terminal portion partially embedded in a carbon material brush contact portion.

16. The rotor according of claim 10, wherein the commutator segments form a cylindrical sliding contact surface.

17. The rotor of claim 10, wherein the commutator segments form a planar sliding contact surface.

18. The rotor of claim 10, wherein the axially extending annular skirt is divergent.

19. The rotor of claim 10, wherein the distal end of the skirt confronts a radially outer portion of an adjacent axial end face of the rotor core across a small gap.

* * * * *